(12) United States Patent
Harrington et al.

(10) Patent No.: US 8,099,763 B2
(45) Date of Patent: Jan. 17, 2012

(54) APPARATUS AND METHOD FOR RANGE-CONFINED COMMUNICATIONS

(75) Inventors: Kendra S. Harrington, Irvine, CA (US); Allen J. Huotari, Garden Grove, CA (US); Matthew McRae, Laguna Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 1050 days.

(21) Appl. No.: 11/510,159

(22) Filed: Aug. 25, 2006

(65) Prior Publication Data
US 2008/0049766 A1  Feb. 28, 2008

(51) Int. Cl.
G06F 15/16 (2006.01)
H04L 29/08 (2006.01)
H04K 1/06 (2006.01)
H04L 12/28 (2006.01)

(52) U.S. Cl. .............................. 726/4; 380/258; 370/401
(58) Field of Classification Search ........ 726/4; 380/258; 370/401
See application file for complete search history.

(56) References Cited

U.S. PATENT DOCUMENTS

| | | | | |
|---|---|---|---|---|
| 5,706,428 | A * | 1/1998 | Boer et al. | 370/342 |
| 7,542,421 | B2 * | 6/2009 | Srikrishna et al. | 370/235 |
| 2002/0077077 | A1 * | 6/2002 | Rezvani et al. | 455/410 |
| 2004/0151108 | A1 * | 8/2004 | Blasco Claret et al. | 370/206 |
| 2005/0160450 | A1 * | 7/2005 | Stephens et al. | 725/35 |
| 2006/0056636 | A1 * | 3/2006 | Schrum | 380/273 |
| 2006/0239217 | A1 * | 10/2006 | Hassan et al. | 370/311 |
| 2006/0253736 | A1 * | 11/2006 | Rudolf et al. | 714/12 |
| 2007/0009015 | A1 * | 1/2007 | Kunii et al. | 375/219 |
| 2007/0211902 | A1 * | 9/2007 | Newman et al. | 380/278 |

OTHER PUBLICATIONS

Chen, Xiaohu et al. "Power Adaptive Broadcasting with Local Information in Ad hoc networks", 2003.*
Duncan, Breanne et al. "Low-Power, Secure Routing for MICA2 Mote", 2004.*
Xu, Shugong et al. "Revealing the problems with 802.11 medium access control protocol in multi-hop wireless ad hoc networks", 2002.*
Newman, Richard et al. "Protecting Domestic Power-line Communications", Jul. 2006.*

* cited by examiner

*Primary Examiner* — Michael Simitoski
(74) *Attorney, Agent, or Firm* — Haynes and Boone, LLP

(57) ABSTRACT

Range-confined security management adapter and method simplify security deployment in a network. First RC security information, including nearest- and k-neighbor information, is transmitted between authenticating neighbor and supplicant neighbor using a predetermined transmission adaptation technique. The adapter can evoke a response from the neighbor by adapting the initial transmitted signal power level, and increasing incrementally; the initial transmitted signal bit rate, and decreasing incrementally; or both, in response to second RC security information signal. RC communications are effected at low power, high bit rate, or both, establishing secure configuration, effecting secure communication, and thwarting miscreant intrusion into the network.

19 Claims, 3 Drawing Sheets

APPARATUS AND METHOD FOR RANGE-CONFINED COMMUNICATIONS

CROSS-REFERENCE TO RELATED APPLICATIONS

The present application is related to U.S. patent application Ser. No. 11/510,449, entitled "Apparatus And Method For Secure Configuration Of Shared Medium Devices," and to U.S. patent application Ser. No. 11/510,406, entitled "Apparatus And Method For Secure Configuration Of Shared Powerline Devices," both filed on even date herewith, both co-assigned to the same Assignee, and both incorporated herein by reference in their entirety.

BACKGROUND

1. Technical Field

The present invention relates to network security apparatus and methods and, in particular, to network adapters and methods providing a secure setup for shared physical medium devices.

2. Related Art

A network can describe a system of two or more electronic devices coupled by a channel—an interconnecting signal path using a transmission medium. In general, a communications network is a service network formed to exchange data between the networked devices. The rate, at which data can be transferred reliably over that interconnecting signal path within a defined interval, is the channel capacity or throughput. In a real communications channel, throughput is constrained by the available channel bandwidth and the noise present in that channel. Bandwidth corresponds to the frequency range of the particular communication channel operates, and the rate at which data is communicated through that channel. Many types of noise exist, including for example, additive white Gaussian, periodic pulse, a periodic pulse, single tone, and multiple tone, with each type imposing a characteristic penalty on channel capacity. In general, the data rate of reliable communication is directly proportional to the frequency range of the signal used for the communication.

The Shannon-Hartley Capacity Theorem establishes the maximum amount of error-free data that can be transmitted over a communications channel with a specified bandwidth, in the presence of noise interference and data corruption:

$$C = BW * \log_2\left(1 + \frac{S}{N}\right)$$

or, alternatively, $$C \square BW * \left(1.44 * \ln\left(1 + \frac{S}{N}\right)\right)$$

where
C is maximum channel capacity (bps);
BW is channel bandwidth (Hz); and
S/N is average channel signal-to-noise power ratio (SNR).

Thus, the Shannon-Hartley Capacity Theorem indicates that the rate at which data can be transmitted over a communications channel can be increased up to the channel capacity and, conversely, that no useful information can be transmitted beyond the channel capacity, because the probability of error at the receiver increases without bound, as the data transmission rate is increased. While the Shannon-Hartley Theorem establishes the maximum rate at which data can be communicated over a channel, many practical factors significantly limit the capacity of a real channel. Exemplary practical factors include the choice of transmitter and receiver; the physical distance between, and the relative placement of, the transmitter and the receiver; the nature of the transmission medium used by the channel to couple the transmitter and receiver; the communication environment of the channel; the predicted noise levels for a given implementation; channel-imposed nonlinearities; and the presence of other transmitters on a channel. Implementation factors are diverse, ranging from adopted or imposed standards, to regulating body constraints, to production costs, and to the end-use uncertainties.

Typically, transmitters and receivers are designed to meet adopted or imposed standards, while simultaneously achieving some acceptable level of reliable data transfer over a range of presumed adverse conditions. For example, the exemplary Gigabit Ethernet family of standards describes multiple types of communication channels intended to communicate data at a rate of 1000 Mb/s with 100% reliability despite (limited) errors in the data stream. One such standard, IEEE Std. 802.3ab (1000BASE-T), specifies the requirements for the physical layer for a CSMA/CD baseband EEPN, which uses electrical signaling to communicate data to a distance of 100 meters over a transmission medium of four pairs of 50-ohm Category 5 balanced copper cabling, by transmitting at a power level of about one watt. Another such standard, IEEE Std. 802.3z specifies the requirements for the physical layer for several CSMA/CD baseband EEPN architectures, including 1000BASE-L, in which a transmitter uses a longwave laser operating at a wavelength of about 1300 nm to communicate data signals to a distance of 5000 meters over a 10 micron single-mode optical fiber transmission medium, by transmitting at a power level of −3 dBm (0 dBm=1 mW). However, the rates and metrics specified by the aforementioned standards are closely tied to the transmission medium used at the physical layer of the network. Significant departures from the corresponding standard, for example, using a lower transmitted signal power, a higher transmitted bit rate, consuming greater bandwidth, and so on, will likely produce a substantial increase in transmitted bit error rate and a sharp decrease in experienced transmission reliability.

Accordingly, current network adapters, conforming to these and other communication standards, are designed to combat deleterious factors that degrade the maximum achievable throughput in a specific transmission medium, by employing transceivers designed to consistently transmit robust signals at a defined minimum transmitted power that is sufficient to reach the standard-specified maximum signal range, or alternately, maximum network segment length (e.g., 100 meters, 5000 meters). Such network adapters are widely used in shared medium networks.

In a shared medium network, all networked devices share the same transmission medium, but only one device can drive the network at a time. Even so, networked devices designed for use with a shared medium are adapted to offset signal degradation by the transmission medium and to accommodate the effects induced by the network couplings and by the listening networked devices.

A type of shared medium network, rapidly achieving popularity, is shared services, shared transmission medium (S3M) network. In a shared medium network, the network transmission medium may be dedicated to one type of service, e.g., a CSMA/CD data networking service. A shared medium of this type may use signaling methods and specified transmission media that facilitate high-performance data networking services. By comparison, in an S3M network, the network transmission medium is capable of providing services other than data networking services. Exemplary services offering shared services, shared transmission medium include, without limitation, wireline telephony, electrical power utility, and cable-access services, with the respective shared transmission medium being structural household telephony wiring, structural electrical power utility wiring, and structural or installed coaxial cabling. Thus, an S3M network can have an ad hoc topology, extendable by simple, readily available extension cables and patch cords that potentially is hostile to high-bandwidth digital communications. For example, S3M infrastructures can experience signal reflections, frequency-dependent channel transfer functions, variable and uncharacterized operating parameters, for example, signal and power transients, varying impedances, impulse noise, and RF ingress and egress. Also, an S3M network may be coupled to an existing commercial or public transmission service network, which may introduce additional noise into the data network channel of the S3M network. To combat the potentially hostile environment posed to the data network channel sharing services on a shared services, shared transmission medium, current S3M network networked device client adapters also are adapted for robust transmissions to offset signal degradation that may exist in the S3M environment.

Moreover, although convenient and popular, shared medium networks, including S3M networks, can be vulnerable to eavesdropping and compromise, leaving attached devices exposed to unauthorized access, misuse, and tampering (collectively, intrusion). Unfortunately, no unified, standard security implementation has been devised to protect every network in every environment, and security mechanisms effective in one environment for one type of shared medium network, may offer little protection to other implementations. In practical use, traditional network security mechanisms, such as user-initiated activations, hands-on authentication protocols, and out-of-band security password or key transfers, can be cumbersome to implement and manage, and may be particularly unwieldy in the context of headless devices, including those disposed in inconvenient locations within a networked premises (e.g., in an attic or crawl space or behind a large appliance).

Despite attempts to simplify security activation for end users, "easy" mechanisms may require multiple steps, and, unfortunately, significant user interaction. Such mechanisms may be improperly implemented, thereby offering only an illusion of security. A security implementation process that is too cumbersome or too inconvenient may be ignored out of frustration by a user, providing an opportunistic miscreant with numerous avenues for intrusion into the user network. Even worse, when faced with burdensome security obligations and daunted by the risks of operating an unsecured network, a consumer may be dissuaded from deploying a network in the home or a small business, in the first instance.

It is desirable, therefore, to provide methods and apparatus for simplifying network security deployment and use, thereby encouraging consumers to benefit from the ubiquitous use of networks and networked devices point networks. More so, it is desirable to beneficially engage, rather than combat, communication channel characteristics otherwise considered to be deleterious factors that degrade the maximum achievable throughput for a chosen transmission medium.

DETAILED DESCRIPTION

Figure 1:
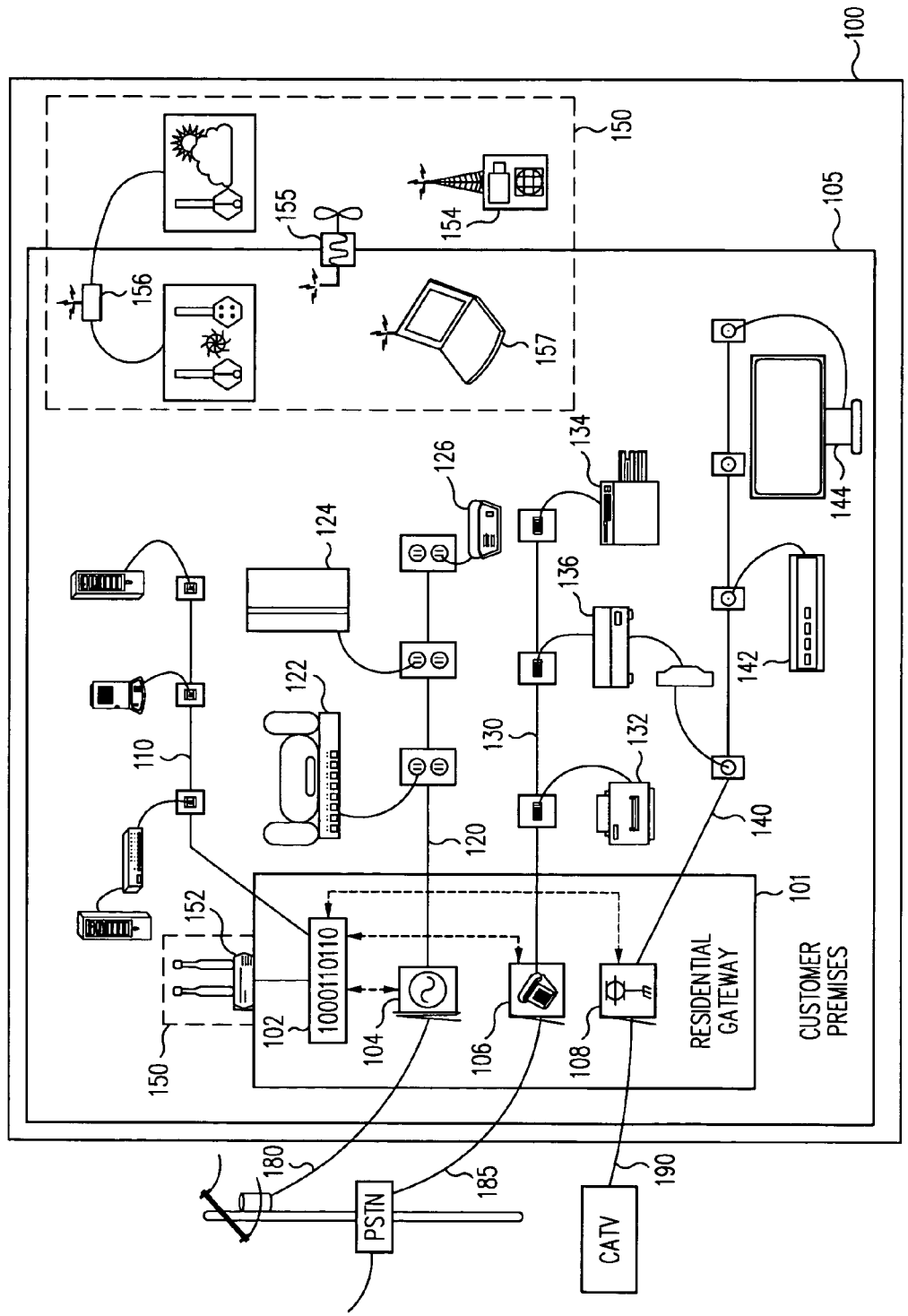
FIG. 1 is a diagrammatic representation of a home network including end-point networks configured according to embodiments of the invention herein.

Embodiments according to the present invention provide methods and apparatus for simplifying security deployment in a network. Range-confined (RC) communication method and apparatus embodiments herein are advantageous in applications where sensitive, privileged, or locally relevant information is transmitted or exchanged between networked devices. Embodiments herein provide a security management service by leveraging one or more limiting characteristics of a noisy communication channel, in transmitted range of sensitive security management service information is selectively limited. By simple analogy, the effect of two networked devices employing RC communication to exchange sensitive information over a shared medium network can be similar to one whispering secrets in another's ear amid a noisy crowd. Importantly, unlike a conventional networked device (hereinafter, client adapter) that is designed to combat signal degradation factors imposed by the particular communication environment, an RC communication client adapter advantageously employs selected signal degradation factors to limit the range of signals exchanged between transmitter and receiver.

In contrast, a conventional client adapter is designed to overcome an expected level of noise and signal attenuation in a channel using a transmitter that is capable of driving a transmission medium segment having a maximum standard-specified segment length. This transmitter is also capable of impressing data signals onto the maximum length transmission medium segment up to a maximum standard-specified transmission rate, with a maximum transmission error rate, using a minimum standard-specified transmitted signal power level. For example, a conventional transmitter conforming to 1000BASE-T Gigabit Ethernet-over-Copper network communication standards (IEEE Std. 802.ab) is designed to transmit encoded data signals to a comparable receiver, using a minimum transmitted signal power level, which achieves a nominal 1 Gbps maximum transmission rate with a bit error rate of $10^{-10}$ over four-pair, balanced Category 5 copper cabling transmission medium having a maximum segment length of up to 100 meters. A conventional transmitter typically employs the minimum standard-specified transmitted signal power level, even if a suitable receiver is connected to the transmission medium at a location closer to the transmitter than the maximum standard-specified segment length. Certain conventional transmitters may feature a selectable transmission power, however, the transmission power level selected generally corresponds to a standard-specified transmission distance, relative to contemporaneous transmission medium characteristics. Such full-powered, maximum-throughput transmissions offer miscreants the opportunity to employ rogue networked devices to surveil and create a security intrusion upon a network.

Advantageously, RC apparatus and method embodiments according to the invention herein implement can thwart such security intrusions by communicating over a transmission medium, using a transmitted signal power level and a transmitted signal bit rate, which are sufficient to exchange sensitive configuration and security information between adjacent networked devices, but which may be difficult or unlikely to be recovered from the network transmission medium by a rogue network device located beyond the preselected RC signal operating range. As used herein, the term "range-confined" (RC) describe a RC signal operating range on the order of between about 0.1 meter to about 100 meters, with many applications having a range of between about 1 meter to about 10 meters.

Method and apparatus embodiments according to the invention herein, respectively implement RC communication in a network, by exchanging signals between transmitter and receiver signals at a maximum transmission rate that may be greater than maximum transmission rate specified by a networking standard representative of a preselected transmission medium, and by being so configured. In addition, apparatus and method embodiments herein respectively implement RC communication by exchanging signals between transmitter and receiver at maximum transmitted signal power level that is less than minimum transmitted signal power level to achieve a predetermined nominal signal range specified by a networking standard representative of a preselected transmission medium, and by being so configured. Also, apparatus and method embodiments herein respectively implement RC communication by exchanging signals between transmitter and receiver at a maximum signal range, or RC operating range, which is less than the maximum signal range, or distance, specified by a standard representative of a preselected transmission medium, and by being so configured. Moreover, respective method and apparatus embodiments herein can implement RC communication by exchanging signals between transmitter and receiver signals that employ at least two of the foregoing, and by being so configured.

As used herein, the term network encompasses, but is not limited to, wireline network and wireless networks. A wireline network conducts electrical signals over a guided transmission medium, including coaxial cable, fiber-optic cable, shielded and unshielded twisted pair (STP/UTP) cable, power cable and cord, and telephone wire and cable. A wireless network radiates electromagnetic signals an unguided transmission medium (e.g., free space), with transmission and reception being achieved by antenna. A network also may describe, without limitation, a system of one or more interoperable, heterogeneous, multiple-access, end-point networks (EPN), which may be disposed in premises. An EPN can possess constituent networks including one of a wireline network or a wireless network, which may be a shared medium network or an S3M network. A premises is an end-user environment such as a home, a home office, or a facility in business, industry, academia, or public administration. In general, an EPN receives end-point services, including public utility, commercial multimedia, and data networking services, whether by guided media or unguided media.

RC apparatus and method embodiments include RC security management service embodiments in which a predetermined adjacency, or neighborhood, may be defined between at least two RC client adapters, or neighbors. Desirably, the predetermined adjacency, or neighborhood, generally corresponds to a preselected RC operating range to further limit intrusion into the neighborhood and into the network formed by the RC client adapters delimited therein. In general, the range of a communication link between neighboring client adapters can be constrained to a preselected RC signal operating range by limiting the bandwidth imposed on the link, by limiting the transmitted power used by a client adapter to impress signals on the predetermined transmission medium, or a combination thereof.

Conveniently, high-bit-rate transmissions tend to use more energy-per-bit to meet a given bit error rate (BER) than do low-bit-rate transmissions. Therefore, the "effective" range of a high bit rate transmission tends to be less than the "effective" range of a low-bit-rate transmission when communicated by an RC client adapter using a predetermined power level and with a fixed, predetermined bandwidth. Thus, increasing the transmitted signal bit rate of an RC communication tends to decrease the effective range of signals transmitted over a given segment of predetermined transmission medium. Conversely, increasing the transmitted signal power level of an RC communication tends to increase the effective range of signals transmitted over the given segment.

Within the context of RC security management techniques herein, a "low" transmitted signal power level is generally less than the signal recovery power level, that is, the minimum power level at which a receptive client adapter may recover the transmitted signal from the transmission medium. A signal recovery power level may be described directly or indirectly by a corresponding networking standard. On the other hand, a "high" transmitted signal bit rate may is generally greater than a maximum standard-specified transmission rate, which may be described directly or indirectly by a corresponding networking standard. Using one or both of a "low" transmitted signal power level or a "high" transmitted signal bit rate, a neighboring device may be substantially unable to discern transmitted data, under the extant channel conditions of the predetermined transmission medium. Also, as used herein, an "effective" low transmitted signal power level is a marginal transmitted signal power level which may be sufficient to allow a neighboring device to discern transmitted data under the extant channel conditions, but is not required to be. Similarly, an "effective" high transmitted signal bit rate is a marginal transmitted signal bit rate which may be sufficient to allow a neighboring device to discern transmitted data under the extant channel conditions, but is not required to be. In view of the teachings herein, a person of ordinary skill in the art would know to apply the principles illustrated by the Shannon-Hartley Capacity Theorem, to factors such as communication channel characteristics, signaling environment characteristics, communication technique and protocol, as well as the characteristics of the client adapters serving as respective transmitter and receiver, to determine at least one of a suitable initial effective transmitted signal bit rate or a suitable initial effective transmitted signal power level, as well as to select at least one of a predetermined bit rate decrement and a predetermined power level increment, for a selected network architecture and predetermined transmission medium.

Within the context of the foregoing, FIG. 1 illustrates network 100, which operates within a defined region, including premises 105. Network 100 can include one or more constituent wireline or wireless networks. RC apparatus and method embodiments according to the present invention can be implemented advantageously to be operable on network 100, as well as on the one or more constituent wireline or wireless networks. Exemplary wireline networks may include, without limitation, an Ethernet EPN (EEPN) 110; a powerline network (PEPN) 120; a phoneline network (TEPN) 130; a cable network (CEPN) 140; and a wireless EEPN (WLAN) 150. EEPN 110 can include EEPN host adapter (EHA) 102, and EEPN client adapters 112, 114, 116. PEPN 120 can include powerline host adapter PHA 104 and powerline networking client adapters 122, 124, 126. TEPN 130 can include phoneline host adapter THA 106 and phoneline networking client adapters 132, 134, 136. CEPN 140 can include cable host adapter CHA 108 and cable services networking client adapters 142, 144. WLAN 150 can include wireless access point WAP 152 and wireless networking client adapters 154-

157. Wireless local area network (WLAN) 150 can be a constituent of network 100, and may be coupled to EEPN 110, for example, by way of AP 152.

Residential gateway 101 is an adapter capable of providing ingress, egress, or both, of shared services to premises 105, and further, may couple a shared service to one or more of networks 110, 120, 130, 140, 150. For example, gateway 101 can provide ingress of standard electrical power and digital services over public electrical power utility shared medium 180 to PEPN 120 by way of powerline host adapter (PHA) 104. Egress of digital signals from premises 105 impressed into PEPN 120 may be communicated over shared medium 180 through PHA 104. While illustrated to be an integral part of gateway 101, PHA 104 may be separate from, but in networking communication with, gateway 101. Similarly, one or more of EHA 102, THA 106, CHA 108, and WAP 152 may be integrated with, or may be separate from, gateway 101. Gateway 101, and wireline adapters EHA 102, PHA 104, THA 106, CHA 108, can be configured to provide some security apparatus and functions to the respective constituent elements of network 100. Nevertheless, it may be advantageous for the devices forming the respective networks 110, 120, 130, 140, and 150 to implement security and configuration functions locally, thereby reducing exposure to intrusion.

RC apparatus and method embodiments many be beneficial to network 100, which may have an increased risk of intrusion because of wireless, or S3M network components. One or more of client adapters 112, 114, 116, 122, 124, 126, 132, 134, 136, 142, 144, 154, 155, 156, 157, can be configured to provide RC communications over a predetermined transmission medium and to perform an RC security management service, in addition to providing routine networking communications and services in accordance with corresponding networking standard. One or more of host adapters 102, 104, 106, 108, and 152 also may include RC client adapters. Thus, the term "RC client adapter" may refer to one or more of the foregoing adapters, so configured, as modified in context.

Conveniently, RC security management services can be provided by an RC client adapter, such as client adapter 132, that is activated to function as a temporary, ad hoc security management device, as may be used during installation, setup, or configuration of network. RC security management services including network configuration RC security management services and security setup RC security management services. Advantageously, RC security management services also can offer secure network security management for routine or periodic security management functions occurring during network operations.

When a network is forming or changing configurations, a network, such as network 100 or constituents, can be vulnerable to intrusion and tampering when the network is forming, or changing configuration. Desirably, a first RC client adapter may serve as an authenticating device (AD) to a second RC client adapter acting as a supplicant device (SD), thereby forming a secure network channel facilitating secure communication over network during routine operations. Beneficially, an AD may seek an SD available to be authenticated and provide RC security management authentication services thereto; and an SD may seek an AD and receive be RC security management authentication services therefrom. However, an AD may limit provision of RC security management authentication services to SD disposed within a predetermined adjacency, or neighborhood, and may reject or ignore discovery signals or discovery response signals from SD external to the neighborhood of the AD. Conveniently, an RC security management service may allow a first adapter, after authentication, to serve as an authenticating device (AD) to a supplicant device (SD). Once authenticated, SD can be reconfigured as an AD that can serve as an AD to another SD.

It is advantageous to include at least two RC client adapters in a network, including exemplary networks 110, 120, 130, 140, and 150. With TEPN 130 as an example, at least two RC client adapters 132, 134 may employ RC communication to provide an RC security management service, to lessen the likelihood of rogue client adapter or network hopping devices from being interposed in constituent TEPN 130 of network 100. RC client adapter 132, 134 can employ an RC security management service to alter the effective range of a transmitted signal by adapting one or both of the transmitted signal bit rate and the transmitted signal power level. The transmitted signal can include RC security management information communicated between RC client adapters 132, 134. One client adapter, e.g., adapter 132, can be an AD; another, e.g., adapter 134, a SD. The RC security management information can be information considered to be sensitive, privileged, or locally-relevant, with respect to an RC client adapter 132, 134. RC security management information can include without limitation, discovery information, authentication information, and configuration information. RC security management information also may include neighbor information.

Exemplary discovery information may include without limitation network, address, and routing information; location-awareness information, which may be physical, logical, or both; and signaling indicia. Exemplary authentication information may include without limitation an RC security management policy; a password or a passphrase; a key, which may be a shared key; pads, codes, cues and hints; handshake symbols; ad hoc synchronization data; protocol and algorithm selection; and other security information. Exemplary configuration information may include device and client adapter configuration and status information; and mode, operation, power-savings, and soft switch setting information. Exemplary neighbor information may include without limitation discovery, authentication, and configuration information regarding at least one neighboring device or client adapter. In addition, RC security management information can include an RC security management policy, which can be useful to establish, promulgate, and enforce security policies pertaining to at least one neighborhood of a network. An RC security management policy can include, without limitation, at least one of an authorization policy, an authentication policy, and an access control policy.

Selected RC security management apparatus can be configured to provide RC security management services to create a predetermined adjacency, or neighborhood, relative to at least two RC client adapters 132, 134. RC security management services also may be used by RC client adapter 132 to discover a presence of a proximate RC client adapter 134, 136 disposed in a neighborhood, that is, a "neighbor" adapter. An RC client adapter can be configured to transmit an RC discovery signal on a predetermined transmission medium, to locate neighbor adapter 134, 136, as well as to receive an RC discovery signal, which may be transmitted by proximate SD 134, 136 seeking neighbors. First RC client adapter 132, an authenticating neighbor (AN), can be configured to provide an RC security management authentication service to a second RC client adapter 134, 136, a supplicant neighbor (SN). Pursuant to the RC security management authentication service, AN 132 may interrogate, negotiate with, gain access to, and identify the SN 134, 136. The AN may determine, for example, whether the SN is a member of "approved" client adapters, whether the SN is eligible for enrollment into the neighborhood of the AN, and whether the SN was previously enrolled in the neighborhood.

Unlike existing security procedures, where adapter security activation, and security management information transmission can create opportunities for intrusion, RC security management techniques of present embodiments can substantially limit the effective range over which security and configuration information are conveyed to as few as one neighboring adapter. Where RC security management techniques include k-nearest neighbor authentication, security management information may be conveyed as far as the k-th nearest neighbor. AN 132 also can determine whether the proximate SD is a most proximate SD, that is, a "nearest neighbor" SD, relative to the AN, or is be a neighbor which may be disposed in a defined k-th proximity, that is a k-th neighbor relative to the AN. Regarding TEPN 130, the nearest neighbor to AN 132 can be SN 134. A neighbor disposed in k-th proximity relative to AN 132 can be SN 136, where k=2. An SN 134, 136 can be configured to provide a RC security management service generally complementary to AN 132, in that SN 134, 136 can be configured to recognize, to negotiate with, to allow access by, and to exchange RC security management information with AN 132. In selected embodiments, it may be desirable to configure AN 132 to limit an RC security management authentication service to SN, such as SN 134, disposed in the neighborhood of AN 132. Alternatively, AN 132 also may be configured to enroll in a first neighborhood (e.g., AN 132-SN 134), an SN (e.g., SN 136) that is a member of a second neighborhood (e.g., AN 132-SN 136), thus reconfiguring the first neighborhood to include AN 132, SN, 134, SN 136. In addition, AN 132 may be configured to define and manage at least two neighborhoods. At least a portion of the neighborhoods may overlap.

Figure 3:
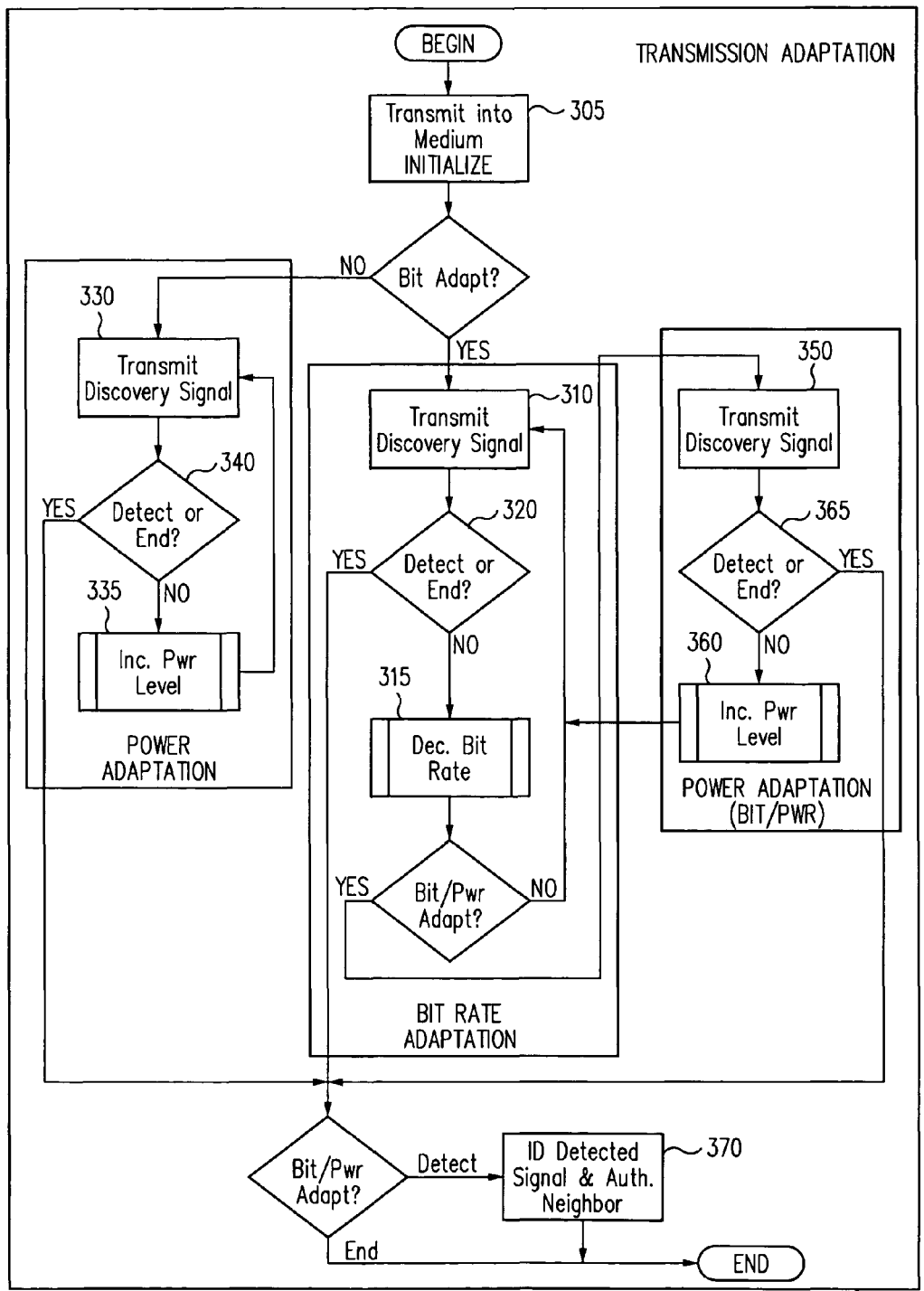
FIG. 3 is a flow diagram illustrative of RC communication transmission adaptation techniques, in accordance with embodiments of the invention herein.

In accordance with the RC apparatus and method embodiments herein, and as further illustrated RC communication transmission adaptation 300 in FIG. 3, AN 132 can be configured to transmit to SN 134, 136 a discovery signal (S305) over a predetermined transmission medium, e.g., the transmission medium of TEPN 130, using a preselected effective low transmitted signal power level. The discovery signal can be adapted by transmitting at an initial effective high transmitted signal bit rate, (S310) with the transmitted signal bit rate being decreased (S315) according to a predetermined bit rate decrement. The discovery signal may be transmitted (S320), until AN 132 receives a discovery response signal from SN 134, 136 responding to the discovery signal, or during a predetermined transmission state. In an alternative, AN 132 can be configured to transmit a discovery signal (S305) over a predetermined transmission medium using an effective high transmitted signal bit rate. The discovery signal can be adapted by transmitting at an initial effective low transmitted signal power level (S330), with the transmitted signal power level being increased (S335) according to a predetermined transmitted signal power level increment. The discovery signal may be transmitted (S340), until AN 132 receives a discovery response signal from SN 134, 136 responding to the discovery signal, or during a predetermined transmission state.

In another alternative, AN 132 can be configured to transmit a discovery signal to SN 134, 136 over a predetermined transmission medium, using an initial effective high transmitted signal bit rate and an initial effective low transmitted signal power level (S350). The discovery signal may be adapted by increasing the transmitted signal power level and by decreasing the transmitted signal bit rate according to a predetermined transmitted signal power level increment (S360), and according to a predetermined transmitted signal bit rate decrement (S315), respectively. The discovery signal may be transmitted (S365/S320), until AN 132 receives a discovery response signal from SN 134, 136 responding to the discovery signal, or during a predetermined transmission state. Upon receiving a discovery response signal from SN 134, 136, AN 132 can exchange RC security management information (S370) with SN 134, 136, including at least one of an RC security management authentication information, an RC security management configuration information or an RC security management security set-up information. In response thereto, SN 134, 136 can change a configuration and can be induced to engage in secure network communication, including encrypted communication, over the network TEPN 130, as well as network 100, for example, using a security key secretively provided to SN 134, 136 by AN 132 during an RC security management service. After SN 134 has been authenticated as an authorized device on TEPN 130, SN 134 may change a configuration to serve as an AN to other SD, including SN. In this way, AN 134 may provide an RC security management service to TEPN 130, which may include an RC security management authentication service. In turn, after SN 136 has been authenticated as an authorized device on TEPN 130, SN 134 may change a configuration to serve as an AN to other SD, which may be SN.

The predetermined transmission state may include without limitation an activation period (ACTIVATE/TIMEOUT), a network state (SETUP/CONFIGURATION/OPERATION), a software security activation signal, an enrollment signal received over network TEPN, and a power cycling state (OFF/ON) for an SN 134, 136. Furthermore, it may be desirable to authenticate AN 132 using other techniques and modes of security management services, including those described in U.S. patent application Ser. No. 11/510,449, entitled "Apparatus And Method For Secure Configuration Of Shared Medium Devices," and in U.S. patent application Ser. 11/510,406, entitled "Apparatus And Method For Secure Configuration Of Shared Powerline Devices." Where an EPN is a powerline network, such as PEPN 120, it may be desirable to authenticate one or both of client adapters 122, 124 using a powerline piggyback mode for shared powerline devices as described in the latter reference. It also may be desirable to supplement or to combine enrollment-type security management services with RC security management services, to provide additional, beneficial apparatus and methods for secure configuration of networked devices.

RC communication method and apparatus embodiments can include configuring a wireless access point, such as WAP 152 to be an authenticating device. WAP 152 also may be configured as an AN. Where one or more of wireless client adapters 154-157 are RC client adapters configured to employ RC communications to receive or provide an RC security management service, WAP 152 can serve as AD to SD 154-157. Conveniently, one or more of wireless client adapters 154-157 may be brought within a defined proximate distance of WAP 152 (or vice versa), so that WAP 152 may provide RC security management service, such an RC security management authentication service, to wireless client adapters 154-157 using one or both of a transmitted signal power level or a transmitted signal bit rate that is substantially indiscernible to a rogue or network-hopping device, thereby allowing AN WAP 152 and SN wireless client adapters 154-157 to securely exchange RC security management information without intrusion. After secure configuration, AN WAP 152 and SN wireless client adapters 154-157 may be physically separated to various duty locations, and be capable of engaging in traditional networking services in accordance with a corresponding networking standard.

Figure 2:
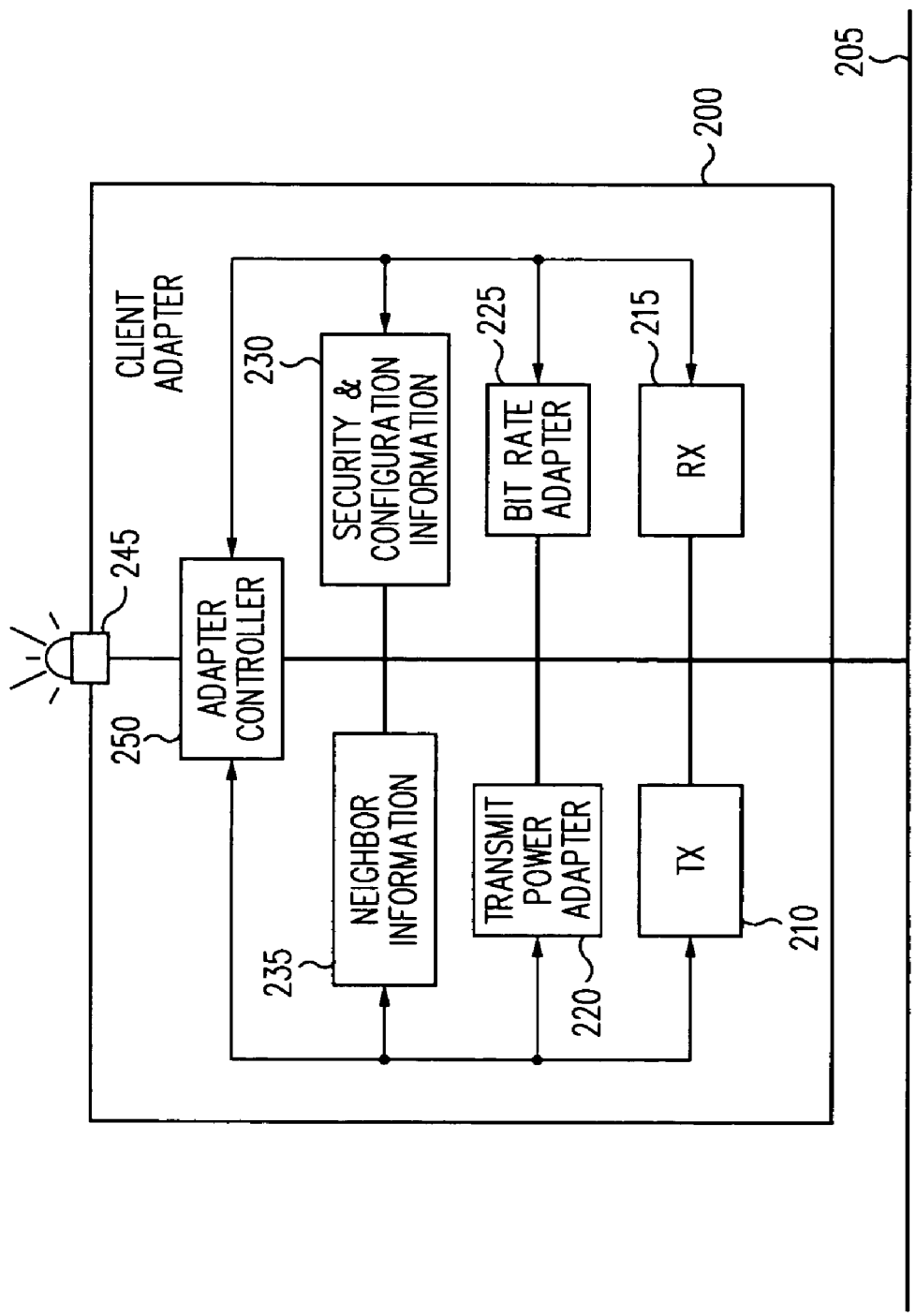
FIG. 2 is a block diagram of a client adapter, in accordance with embodiments of the invention herein.

FIG. 2 illustrates an exemplary client adapter 200, which may be used as a client adapter in home network 100 in FIG. 1, for example, in EEPN 110, PEPN 120, TEPN 130, CEPN 140, or WLAN 150. In general, client adapter 200 can be coupled to transmission medium 205, can transmit signals over medium 205 using transmit module (TX) 210, and can receive signals over medium 205 using receive module (RX) 215. For example, client adapter 200 can be configured to employ TX 210 to transmit nearest neighbor information into medium 205 and to effect a secure nearest neighbor setup, where a nearest neighbor is present and capable of setup. TX 210 is configured to adapt transmission of the signal in accordance with a predetermined adaptation technique. Adapter 200 also may be configured to transmit nearest neighbor information into medium 205, to effect a k-nearest neighbor setup. In accordance with the foregoing principles and embodiments, including those described with respect to FIG. 1, adapter 200 can include a transmit power adapter 220 that adapts the effective power by which signals are transmitted over medium 205, in a manner suitable to implement RC security management. In addition, adapter 200 can include bit rate adapter 225 that adapts the effective bit rate at which signals are transmitted from adapter 200 over medium 205, in a manner suitable to implement RC security management.

In that regard, TX power adapter 220 may transmit signals to medium 205 at an initial effective transmission power level, adapting transmission power level using a predetermined power increment. As another example, where client adapter 200 can be configured to effect one of nearest neighbor setup and of k-nearest neighbor setup, bit rate adapter 225 may transmit signals to medium 205 at an initial effective transmission bit rate, adapting bit rate transmission using a predetermined bit rate decrement. In addition, client adapter 200 can be configured to effect one of nearest neighbor setup and of k-nearest neighbor setup, by which TX power adapter 220 may transmit signals to medium 205 at an initial effective transmission power level, adapting transmission power level using a predetermined power increment, and by which bit rate adapter 225 may transmit signals to medium 205 at an initial effective transmission bit rate, adapting bit rate transmission using a predetermined bit rate decrement. Signals thus transmitted may communicate security management information, as well as configuration information to be detected by another adapter or device seeking to form or to join a network as an authorized neighbor of adapter 200. One or more of initial effective power level, initial effective transmission bit rate, the predetermined power increment, and the predetermined bit rate decrement can be determinable and generally correspond to the signaling environment in which adapter 200 is disposed, including the channel characteristics of medium 205, as well as characteristics of other adapters and devices which may be expected to communicate with adapter 200 to effect security services encompassed by the embodiments herein and their foreseeable equivalents.

Adapter 200 also can include receive (RX) module 215, which can be configured to detect or to "listen" for other devices and adapters, which may signal on medium 205 and seek to communicate with adapter 200 for effecting neighbor security management, configuration, or both. Adapter 200 can include first storage 230 which may be used to retain security and configuration information pertaining to adapter 200. Adapter 200 also may include second storage 235, which may be used to retain information pertaining to another client adapter, as well as to the network interconnected via medium 205. To facilitate data retention while adapter 200 is powered OFF, at least a portion of first storage 230 can be a nonvolatile memory storage, and at least a portion of second storage 235 also may be a nonvolatile memory storage.

In addition, adapter 200 can include adapter controller 250 that is configured to facilitate communication, configuration, and security functions of adapter 200. Exemplary communication functions include signal transmission, signal reception, power level and bit rate setting and adaptation, channel condition adaptation, signal filtering, signal identification and management, and the like, as known to skilled artisans. Exemplary configuration functions can include OSI Layer 1-4 functions pertaining to physical-logical signal translation, device and adapter address management and control, inter- and intra-layer data direction, filtering, management, and control, and the like. Exemplary security functions can include neighbor detection, recognition, rejection, access control, authentication, audit, and authorization. Adapter controller 250 can be configured to engage adapter 200 to serve as an authenticator as well as a supplicant, coupled to medium 205; can be configured to facilitate another adapter, such as adapter 200, in identifying and authenticating a nearest neighbor or k-nearest neighbor, and may be configured to perform an ad hoc network management function, for example, during network startup and the like. Moreover, adapter 200 may provide a perceptible indication of setup or configuration status, using interface device 245, here an LED responsive to controller 250. Although adapter 200 is illustrated to be a wireline adapter coupled to a guided medium, adapter 200 also may be configured, mutatis mutandi, according to the principles herein, to be operable as a wireless adapter.

Many alterations and modifications may be made by those having ordinary skill in the art, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptually equivalent, and also what incorporates the ideas of the invention.

The invention claimed is:

1. A method for providing a secure configuration for networked devices on a network, comprising:
 transmitting a first RC security management information over a medium into the network;
 adapting the transmitting of the first RC security management information into the network responsive to a second RC security management signal to reduce exposure to intrusion; and
 wherein the adapting the transmitting further comprises using a combination of both a predetermined transmitted signal power level adaptation technique and a predetermined transmitted signal bit rate adaptation technique responsive to the second RC security management signal, wherein the predetermined transmitted signal bit rate adaptation technique comprises: determining a maximum standard-specified transmission rate specified by a corresponding networking standard representative of the medium, setting an initial effective high transmitted signal bit rate to be higher than the determined maximum standard-specified transmission rate specified by the corresponding networking standard, and transmitting the first RC security information at the initial effective high transmitted signal bit rate and decreasing the high transmitted signal bit rate according to a predetermined transmitted signal bit rate decrement, responsive to the second RC security management signal, wherein RC communications are effected at both a low power and a high transmitted signal bit rate.

2. The method of claim 1, wherein the first RC security management information comprises a discovery signal transmitted by an authenticating device.

3. The method of claim 2, wherein the first RC security management information comprises a discovery response signal transmitted by a supplicant device.

4. The method of claim 1, wherein the second RC security management information comprises a discovery response signal transmitted by a supplicant device.

5. The method of claim 1, wherein the adapting the transmitting further comprises adapting the transmitting using a predetermined transmitted signal power level adaptation technique, wherein the predetermined transmitted signal power level adaptation technique and the signal bit rate adaptation technique are responsive to a discovery response signal.

6. The method of claim 5, wherein the adapting the transmitting in accordance with a predetermined transmitted signal power level adaptation technique further comprises: transmitting the RC security information at an initial effective transmitted signal power level and increasing the transmitted signal power level according to a predetermined transmitted power level increment, responsive to the discovery response signal.

7. A network adapter, comprising:
an adapter controller that exchanges RC security management information temporarily over a medium in accordance with a predetermined RC security management signal transmission adaptation technique to reduce exposure to intrusion, wherein the predetermined RC security management signal transmission adaptation technique comprises both a predetermined transmitted signal power level adaptation technique and a predetermined transmitted signal bit rate adaptation technique responsive to the RC security management information exchange, wherein the predetermined transmitted signal bit rate adaptation technique further comprises: determining a maximum standard-specified transmission rate specified by a corresponding networking standard representative of the medium, setting an initial effective high transmitted signal bit rate to be higher than the determined maximum standard-specified transmission rate specified by the corresponding networking standard, and transmitting a first RC security information at the initial effective high transmitted signal bit rate and decreasing the high transmitted signal bit rate according to a predetermined transmitted signal bit rate decrement, responsive to a second RC security management signal.

8. The network adapter of claim 7, wherein the adapter controller is configured to engage the network adapter as one of an authenticating device or a supplicant device, and wherein the RC security management information comprises at least one of discovery information, authentication information, configuration information, and neighbor information.

9. The network adapter of claim 8, wherein the adapter controller is configured to adapt a first RC security management signal transmitted in accordance with the predetermined RC security management signal transmission adaptation technique, wherein the first RC security management signal includes RC security management information.

10. The network adapter of claim 9, further comprising:
a transmitter connected to the adapter controller and configured to transmit the first RC security management signal responsive to the adapter controller.

11. The network adapter of claim 10, further comprising:
a transmitted signal bit rate adapter connected to the adapter controller and to the transmitter and, configured to cause the transmitter to adapt a transmitted signal bit rate corresponding to the first RC security management signal transmitted by the transmitter, responsive to the adapter controller.

12. The network adapter of claim 11, further comprising:
a transmitted signal power level adapter connected to the adapter controller, to the transmitter, and to the transmitted signal bit rate adapter, wherein the transmitted signal power level adapter is configured to cause the transmitter to adapt a transmitted signal power level corresponding to the first RC security management signal transmitted by the transmitter, responsive to the adapter controller, and wherein the transmitted signal bit rate adapter responds to the adapter controller to cause the transmitter to adapt a transmitted signal bit rate corresponding to the first RC security management signal transmitted by the transmitter.

13. The network adapter of claim 10, further comprising:
a transmitted signal power level adapter connected to the adapter controller and to the transmitter and, configured to cause the transmitter to adapt a transmitted signal power level corresponding to the first RC security management signal transmitted by the transmitter, responsive to the adapter controller.

14. The network adapter of claim 10, further comprising at least one of:
a transmitted signal power level adapter configured to cause the transmitter to transmit the RC security management signal at an effective initial transmitted signal power level, and to adapt the transmitter to increase a transmitted signal power level in accordance with a predetermined transmitted signal power level increment; or
a transmitted signal bit rate adapter configured to cause the transmitter to transmit the RC security management signal at an effective initial transmitted signal bit rate, and to adapt the transmit module to reduce a transmitted signal bit rate in accordance with a predetermined transmitted signal bit rate decrement.

15. The network adapter of claim 8, wherein the adapter controller is configured to engage the network adapter as an authenticating device, wherein the authenticating device is configured to implement a neighborhood, and wherein the authenticating device is configured to exchange RC security management information as an authenticating neighbor with a supplicant neighbor in the neighborhood.

16. The network adapter of claim 15, wherein the authenticating neighbor further comprises a transmitter connected to the adapter controller and, responsive to the adapter controller, configured to exchange an RC security management signal with a supplicant neighbor, wherein the RC security management signal includes the RC security management information.

17. The network adapter of claim 16, further comprising at least one of:
a transmitted signal power level adapter configured to cause the transmitter to transmit the RC security management signal at an effective initial transmitted signal power level, and to adapt the transmitter to increase a transmitted signal power level in accordance with a predetermined transmitted signal power level increment; or a transmitted signal bit rate adapter configured to cause the transmitter to transmit the RC security management signal at an effective initial transmitted signal bit rate, and to adapt the transmit module to reduce a transmitted signal bit rate in accordance with a predetermined transmitted signal bit rate decrement.

18. The network adapter of claim 17, wherein the supplicant neighbor is a nearest neighbor.

19. A means for network security management, comprising:

transceiving means for exchanging an information over an end-point network;

adapting means for exchanging the information in accordance with a predetermined range-confined security management signal transmission adaptation technique to reduce exposure to intrusion, wherein the adapting means is coupled to the transceiving means and is responsive to the information exchanging over the end-point network, wherein the information is a range-confined security management information, and wherein the transmission adaptation technique further comprises both a predetermined transmitted signal power level adaptation technique and a predetermined transmitted signal bit rate adaptation technique, wherein the predetermined transmitted signal bit rate adaptation technique comprises: determining a maximum standard-specified transmission rate specified by a corresponding networking standard representative of a medium of the end-point network, setting an initial effective high transmitted signal bit rate to be higher than the determined maximum standard-specified transmission rate specified by the corresponding networking standard, and transmitting the information at the initial effective high transmitted signal bit rate and decreasing the high transmitted signal bit rate according to a predetermined transmitted signal bit rate decrement, responsive to the information exchanging over the end-point network, wherein exchanging the information is effected for a temporary function at both a low power and a high transmitted signal bit rate; and controlling means coupled to the transceiving means and the adapting means, wherein the controlling means is configured for one of:
identifying as a neighbor a proximate adapter within a predetermined adjacency on the end-point network;
engaging with the neighbor using a preselected range-confined security management service; and
implementing a range-confined security management policy corresponding to the neighbor.

* * * * *